2 Sheets--Sheet 2.

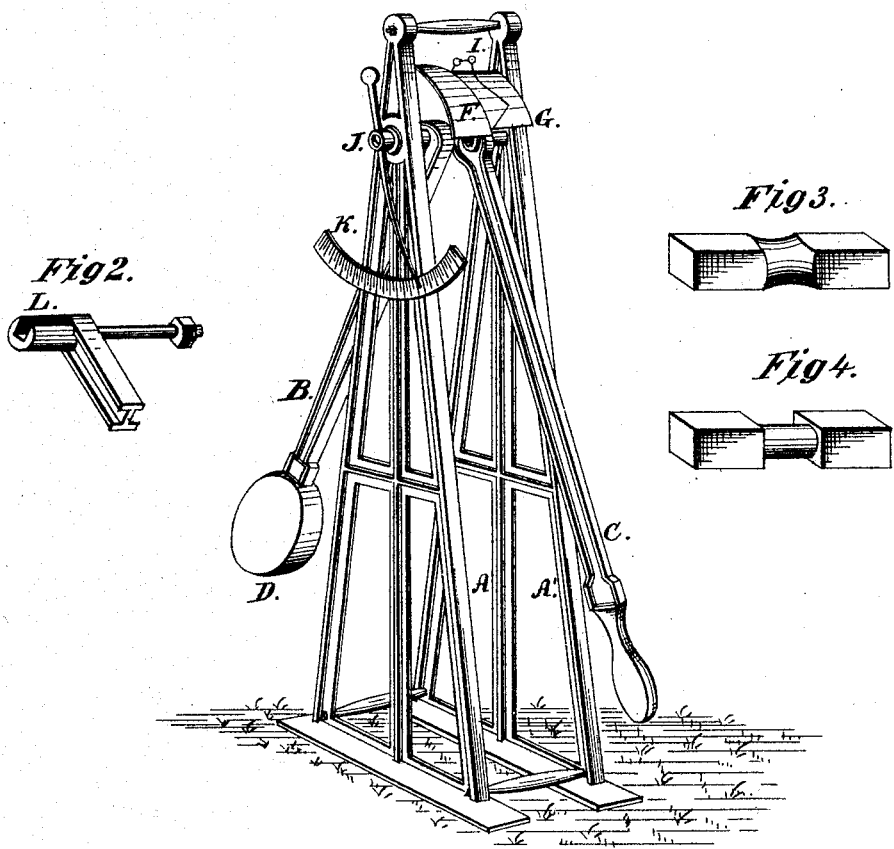

R. H. THURSTON.
Testing-Machines.

No. 155,051. Patented Sept. 15, 1874.

Witnesses:
H. F. Horton.
C. C. Griswold.

Inventor:
Robert H. Thurston
By Frank H. Thurston
Attorney

THE GRAPHIC CO. PHOTO-LITH. 39 & 41 PARK PLACE, N.Y.

UNITED STATES PATENT OFFICE.

ROBERT H. THURSTON, OF HOBOKEN, NEW JERSEY.

IMPROVEMENT IN TESTING-MACHINES.

Specification forming part of Letters Patent No. 155,051, dated September 15, 1874; application filed December 22, 1873.

*To all whom it may concern:*

Be it known that I, ROBERT H. THURSTON, of Hoboken, Hudson county, State of New Jersey, have invented a new and improved apparatus for testing and automatically registering variations in strength, elasticity, and ductility of materials; and I do hereby declare that the following is a full, clear, and exact description thereof, reference being had to the accompanying drawing, which forms a part of this specification.

Figure 5:
Figure 6:
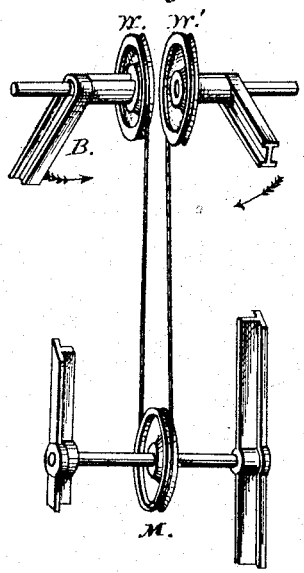
Figure 8:
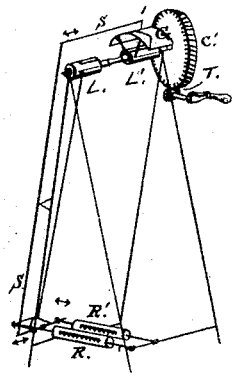
Figure 7:
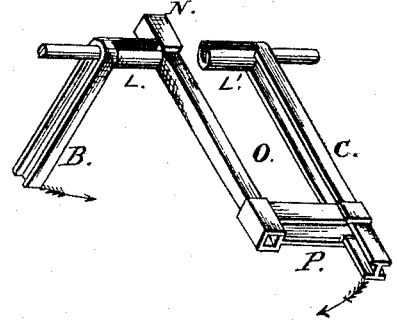

Figure 1 is a perspective view of the apparatus as arranged to measure the torsional resistances of materials. Fig. 2 shows the construction of the axes of the lever-arms B C. Figs. 3 and 4 show convenient forms of pieces to be tested by torsion. Fig. 5 gives examples of the diagrams traced by the recording apparatus. Fig. 6 shows the attachments used in specially experimenting with tensile strains. Fig. 7 exhibits those used in experimenting with transverse strains, and Fig. 8 shows a modification of the machine for heavy work.

My invention is embodied in an apparatus in which the strain to be applied to test the strength or elasticity of any material is transmitted through the piece to be tested by two independent opposing forces, one of which, in combination with a stationary guide-curve, gives a movement to a pencil-holder and pencil, and the other gives a movement to a table covered with a paper, whereby, in the performance of the test of the material, the differential movement between the paper and the recording-pencil, induced by the yielding of the piece which is being tested to the strain applied to it, shall express the quantities of strength, elasticity, or ductility which the material tested possesses.

The frame-work A A' supports two arms, B C, which are suspended from and swing about independent axes in the same line. The arm B carries a weight, D, and the arm C a handle, E, by which it is moved. To the frame is attached a guide-curve, F. A pencil, I, bears against this guide, and, being carried by the weighted arm, is thrown forward as that arm swings outward under the action of the force transmitted through the test-piece from the arm C. Secured to the last-named arm is a table, G, to which is fastened the paper on which the pencil I traces a curve, which forms a complete record of all the conditions of the experiment. A pointer, J, traversing the arc K, is arranged as a maximum-hand, and serves as a check on the automatic record of maximum strength.

The method of experimenting with torsional strains will be first explained.

The axes of the arms B C are counterparts of each other, and are designed as shown in Figs. 2 and 7, each having rectangular recesses L L' to receive the ends of the pieces to be tested, which latter are shown on a larger scale in Figs. 3, 4. The material is accurately fitted to its place, one end fitting the recess in the axis of the weighted arm B, and the other fitted to the corresponding recess in the axis of the arm C. The normal position of the arm B is vertical; but when a force is applied to the lever C it is transmitted through the test-piece to that arm, causing it to swing outward, the effect of which is to react upon the test-piece with a force proportioned to its moment. While the weight of the arm is a constant quantity, the leverage with which it acts is not uniformly progressive in amount, so that equal angular movements through different parts of the arc traversed by the arm B do not exert equal moments of pressure. Therefore, in order that all the ordinates of the curve described by the pencil I be measurable by a common scale, it becomes necessary so to shape the guide-curve F as to move the pencil through equal spaces for equal increments of moment.

If a material absolutely without elasticity were placed in the apparatus and force applied to move the arm C, the relative positions of the arms C and B would not change, and the line traced would be a vertical straight line; but, as a matter of fact, all the materials yield more or less under a force applied, and, as a consequence of such yield, the arm B will have an angular movement less than that of the arm C, and the amount of such angular deflection becomes a measure of the distortion of the specimen tested.

Suppose it be determined to experiment on the torsional resistances of white pine. The piece is turned in the middle to an exact diameter—say, seven-eighths of an inch. The record will be as shown in Fig. 5, and numbered 1. The blank for the diagram, if ruled, being made parallel with the planes in which the arms move, and the pencil placed at one of the points of intersection, the horizontal and perpendicular lines passing through this point become bases from which the respective ordinates and abscisses of the curve will be measured. If the blank be not ruled until after the curve has been described, a line drawn through the points of commencement and termination of the curve will be the horizontal base, and a line at right angles to this base drawn through the point of commencement will be the perpendicular base. When pressure is applied to the handle E, it is opposed by the weighted arm B, and with increasing amount as it swings outward, the pencil attached to it being thrown forward by its contact with the guide-curve G to a corresponding degree until the stress becomes such as to destroy the elasticity of the material. The weight then drops as the fibers yield, the pencil retreating along its guide until it reaches the position from which it started, when the arm is seen to be vertical, and the material twisted apart.

Examining the registry which has been made, we find that as the stress increases the yielding of the wood prevents the pencil from following the diagram-table with equal angular motion, so that the line described inclines backward from the perpendicular, according to the increased amount of twist given, and the angle of inclination which it makes with the perpendicular exhibits the stiffness of the test-piece. When the angle of torsion has reached twenty-five degrees the material has attained its limit of elasticity, and measuring the corresponding ordinate of the curve it is found to be subjected to a strain of eighteen foot-pounds. A slight additional twist parts the outer fibers, and then fiber after fiber yields, the weighted arm dropping, and the torsional angle increasing until the material ceases to offer resistance after twisting through an angle of one hundred and thirty-five degrees.

A trial of Spanish mahogany would result as shown by curve 8. Considerable strength and stiffness are shown by the height of the curve and its slight inclination from the perpendicular. With a pressure of forty-six foot-pounds its torsional angle is but fifteen degrees. Its brittleness is shown by the rapid descent of the curve from this point. At a torsional angle of forty-eight degrees it is seen to intersect the curve of white pine, showing its torsional resistance at that angle to be the same as that of the latter.

White oak has always been remarked for its extraordinary toughness, which quality is clearly shown by the length of the maximum abscissa of its curve, numbered 9. Its elasticity is but little impaired at an angle of sixty-five degrees, and after passing that point it yields very slowly; even when twisted through an angle of two hundred and fifty degrees it offers a resistance of ten foot-pounds.

In the case of hickory, numbered 10, the resistance increases with the amount of torsion until a maximum is reached. The line then drops to a point considerably below, and thence again rises and passes another maximum, which is only reached after a torsion of seventy-five degrees; the resisting moment then becomes considerably greater than at the limit of elasticity. By close observation of the test-piece, while yielding under stress, it will be seen that the first maximum was passed at the instant when the lateral adhesion of the fibers being overcome they slipped upon each other, and the bundle of loose fibers readily yielding the curve dropped until the second maximum was reached—here yielding again occurred, this time by the breaking of the fibers under a longitudinal strain, or that component torsional stress which takes a direction parallel with that of the fibers in their new positions.

It will be clearly seen, from the above examples, that from the diagrams may be deduced every condition attending the distortion and fracture of the piece tested. When drawn upon the same card the several diagrams present to the eye at once the relative stiffness, elasticity, and strength of the materials used, and the areas included between their curves and the base-line are proportional to their torsional resilience.

Although all the examples given are of woods, they are taken for convenience merely, the apparatus revealing with equal precision and clearness the peculiarities of fracture of metals or any other materials.

For heavy work, where the use of a weight would be inconvenient, a substitute is offered by the spring-balances R R', Fig. 8, one or both of which may be used. In place of the arm C is used a worm-wheel, T, and its gear C', the latter being placed upon the axis. The guide-curve will then not be required, the recording-pencil partaking of the movement of the balance by its connections s s, or their equivalents. In designs already completed, a cord is attached to the pencil and leads over a series of guide-pulleys to the foot of the arm B, whence it leads off and is attached to the casing of the spring-balance, or other fixed object, in such a manner that the motion of the arm produces a simultaneous and proportional movement of the pencil in a line parallel with the axis of the arm. The cord is kept tense by means of a spring.

Since the particles exposed to shearing stress offer a resistance varying precisely as their tensile strengths, the vertical scale of the diagram is a scale of tensile strength, and the machine is thus an apparatus for testing tensile strength, as well as the stiffness, torsional strength, elasticity, ductility, and resilience of materials. With the machine here illustrated, this scale is about twenty-five thousand pounds per inch when the weight at the end of the arm is one hundred pounds, the arm being five feet in length.

In the measurement of direct tensile strains, and in all cases where the actual yield is small, it becomes necessary, to admit of convenient measurement, to so proportion the recording apparatus, that the abscisses or the ordinates of the strain-diagrams, whichever may represent such yield, shall, while continuing in proportion to the yield, be on a larger scale than the ordinates or the abscisses which represent the corresponding stress applied.

In measuring resistances to tensile strains, the material may be used in the form of wire also. The ends are secured to the peripheries of the two wheels W W', attached the one to the hub or axis of the arm C, and the other to the axis of the arm B, the bight of the wire passing around a third wheel, M, which latter is adjustable vertically to the length to be tested. The operation is precisely the same as has been explained in connection with torsional experiments, and the line described by the recording-pencil forms a diagram measurable by scale in like manner. The distance of any point in the curve from the perpendicular base is a measure of ductility, and is proportional to the stretch of the wire by a strain, whose amount is denoted by the height of the given point above the horizontal base.

If the apparatus is to be used for investigations of transverse strains, a bar of proper size is held one end by a socket, N, fitted into the recess of the hub of the arm B, and the other end by the socket P, which is secured to the other arm, C. The latter socket can be adjusted in position according to the length of the bar operated upon. Pressure is applied and a curve described as before, the ordinates of the curve measuring the stress applied, and the abscisses exhibiting the corresponding flexure.

It will be seen that the recording apparatus which forms a part of this invention may be applied by attaching proper multiplying-levers to the ordinary forms of machines for testing strength of materials.

What I claim as my invention, and desire to secure by Letters Patent, is—

1. An autographic recording apparatus, consisting of the table G, carrying the card or paper upon which the record is made, the pencil-holder I, and guide-curve F, arranged and combined substantially as described.

2. The machine for testing the strength of materials, consisting of the independent levers or wrenches B and C, or their equivalents, having their axes of rotation in coincident lines, in combination with the frames A A', substantially as described, for the purposes specified.

3. The combination of an autographic recording apparatus, as described, with the testing-machine described, forming an autographic recording testing-machine, for the purposes set forth, and substantially as described in this specification.

ROBERT H. THURSTON.

Witnesses:
HENRY MORTON,
ALFRED M. MAYER.